W. G. McCREA.
FRUIT JUICE DISPENSING DEVICE.
APPLICATION FILED MAR. 27, 1916.
1,215,310.
Patented Feb. 6, 1917.
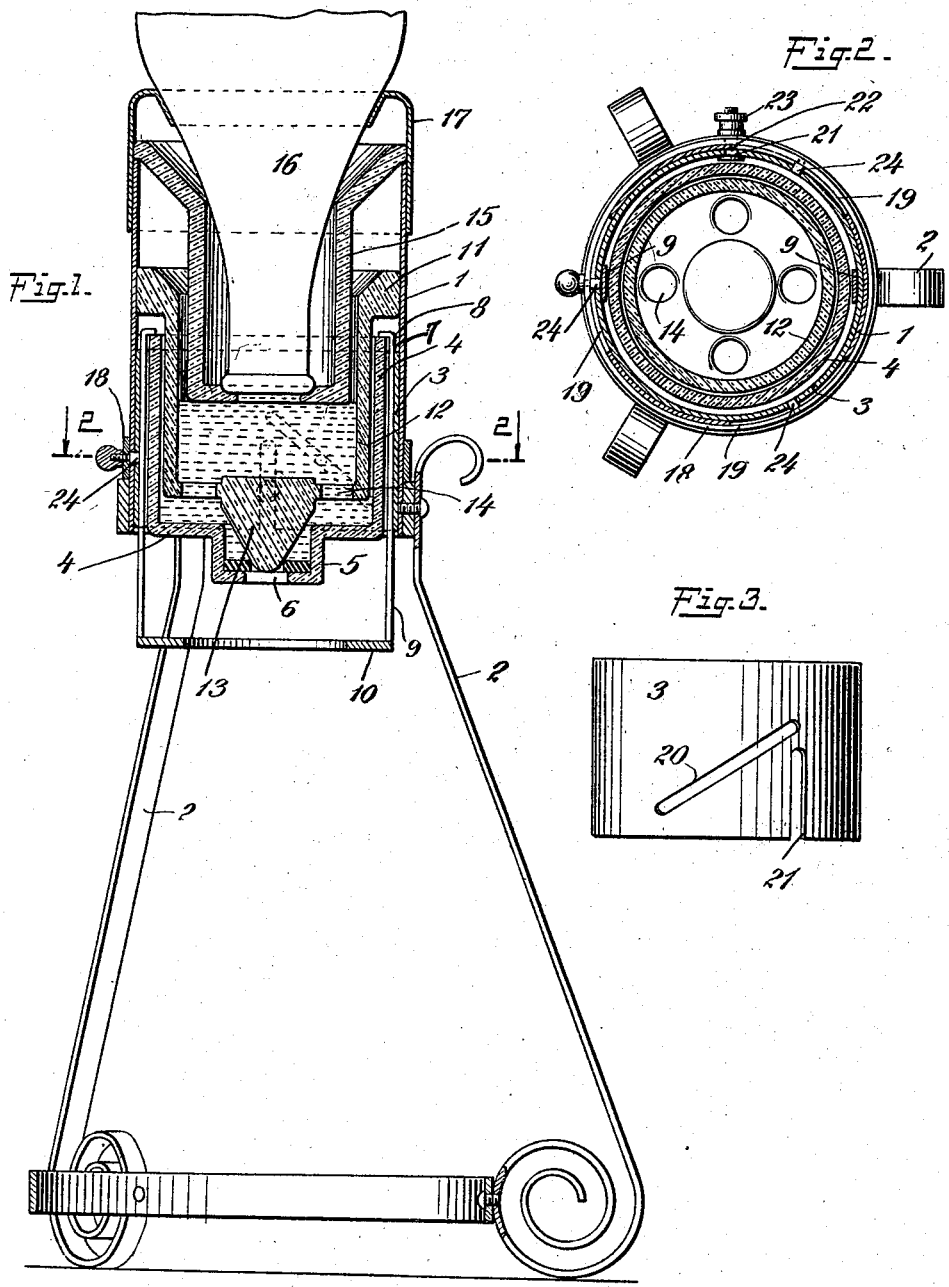
Inventor
Wm. G. McCrea
By his Attorneys
Pennie Davis Marvin

UNITED STATES PATENT OFFICE.

WILLIAM G. McCREA, OF BRONXVILLE, NEW YORK.

FRUIT-JUICE-DISPENSING DEVICE.

1,215,310.

Specification of Letters Patent.

Patented Feb. 6, 1917.

Application filed March 27, 1916. Serial No. 86,902.

*To all whom it may concern:*

Be it known that I, WILLIAM G. MCCREA, a citizen of the United States, residing at Bronxville, county of Westchester, State of New York, have invented certain new and useful Improvements in Fruit-Juice-Dispensing Devices; and I do hereby declare the following to be a full, clear, and exact description of the invention, such as will enable others skilled in the art to which it appertains to make and use the same.

This invention relates to a dispensing device for dispensing fruit juice, syrups, and other liquids, directly from the bottle, in the form of individual charges; and more particularly to such a dispensing device made of glass or like material which will not injure the fruit juice or syrup or other liquid even where the liquid to be dispensed is of an acid nature.

It is a primary object of the invention to provide a dispensing device of the nature indicated which will enable the fruit juice or other liquid to be dispensed directly from the bottle in the form of individual charges of the desired size. It is a further object of the invention to provide for the dispensing of individual charges of different size from the same dispensing device by a suitable regulation of the relation of the parts of the device to each other. Other objects of the invention will appear from the following more detailed description, taken in connection with the accompanying drawings, in which:

Figure 1 shows in central vertical section one embodiment of the invention;

Fig. 2 is a horizontal section taken on the line 2—2 of Fig. 1; and

Fig. 3 is an elevation of the inner adjustable sleeve.

The dispensing device illustrated is made up of the shell or outer casing 1 of cylindrical or other suitable contour supported by legs 2 or other suitable supporting means. Arranged within the casing or outer shell 1 is an inner sleeve or shell 3, also of cylindrical shape and, in the embodiment of the invention illustrated, adjustable vertically with respect to the outer casing 1.

The inner shell 3 supports at its upper end the cup or receptacle 4 having an extension 5 provided with a discharge opening 6 and with a suitable valve seat or packing of rubber or other material which will not injure the fruit juice or other liquid and which will not be acted upon thereby. The rim 7 at the upper end of the cup-shaped receptacle 4 rests upon the upper end of the sleeve 3 and this edge is cut away at a plurality of places, two of which are shown, in order that the raising and lowering arms 9, operated by the ring 10 or in other suitable manner, may pass freely between the inner cylindrical shell 3 and the cup-shaped receptacle 4. The arms 9 are shown as bent over at their upper end so that they will rest upon the rim of the receptacle 4.

Within the cup-shaped receptacle 4 is the sealing device 12 having at its upper end a flange 11 and arranged to be raised and lowered by raising and lowering of the arms 9. The sealing device 12 is in effect a double valve member, carrying on its lower side the valve 13 for closing the outlet opening 6 and carrying on its upper side a sealing device for sealing the mouth of the bottle when in raised position. The sealing device 12 has openings 14 permitting free but somewhat retarded flow of the liquid therethrough when the sealing device as a whole is raised or lowered.

Also within the outer casing 1 and supported from the upper edge of the casing is the holder or support 15 for supporting the bottle 16 in inverted position. This holder is provided with an opening arranged to aline with the opening in the bottle and to form an extension thereof. A cap or closure 17 is also shown mounted upon the outer shell 1 and supported frictionally or otherwise thereon. This cap serves as a supplemental support for the bottle 16 and also serves to cover the dispensing device around the bottle.

Arranged above the ring to which the legs 2 are attached and by which the casing 3 is carried is the operating ring 18 carrying one or more pins 24 extending through horizontal slots 19 in the casing 1 and through helical or inclined slots 20 in the inner supporting sleeve 3. The inner sleeve 3 is also provided with a vertical slot and the outer casing and support with a screw 22 coöperating therewith to prevent rotation of the inner sleeve. By tightening the nut 23 upon the screw the inner shell can be clamped in place and held in the desired place of adjustment. The arrangement of the inner sleeve and ring 18, with their coöperating parts, is such that upon rotation of the ring 18 the pins 24 will cause the sleeve 3 to be raised or lowered.

In practice, the dispensing device is made of glass or other like material which will not act upon the fruit juice or other liquid and which in turn will not be acted upon thereby.

In the operation of the dispensing device the bottle of fruit juice or other liquid is inverted in the manner shown and the cover member 17 is slid up to close the space between the top of the device and the bottle. The fruit juice or other liquid will then flow down into the cup-shaped receptacle 4 until the liquid reaches the level of the inlet from the bottle when the bottle will be sealed and further flow prevented. When it is desired to obtain a charge of the fruit juice a glass or other receptacle is raised into contact with the ring 10 and the ring is raised a sufficient distance to cause the sealing device 12 to seal the lower end of the bottle when further inflow will stop. As soon as the valve 13 is raised from its seat the liquid will begin to flow out and the flow will continue until all of the liquid is discharged or until the valve is again seated.

By adjusting the height of the sleeve 3, the position of the cup or receptacle 4 with respect to the mouth of the bottle can be correspondingly changed with the result that the size of the liquid charge can be increased or decreased at will by simply turning the ring 18 and effecting the corresponding adjustment of the shell 3 and receptacle 4.

It will be noted that the receptacle 4 surrounds the mouth of the bottle and that the size of the liquid charge is determined by the contents of this receptacle below the level of the liquid which will effect the sealing of the bottle and thereby prevent further discharge. The raising or lowering of this receptacle varies the size of the liquid charge to a corresponding degree.

It will also be noted that the sealing device is arranged within the receptacle 4 so that when lowered it will close the opening in this receptacle and when raised it will seal the mouth of the bottle. It will be obvious that the construction of this sealing device can be varied so long as it subserves its intended function of acting as a valve member or sealing device for closing the opening in the bottom of the receptacle when lowered and for sealing the mouth of the bottle when raised. It is, however, of advantage to make this sealing device cup-shaped and to arrange it within the receptacle 4 so that it will be guided by this receptacle and by the shell 1, and so that upon raising the sealing device the liquid contained therein will tend to act as a liquid seal while the device is being raised so that the bottle may be sealed and further outflow during opening of the valve prevented, although such outflow is not objectionable except where a more exact regulation of the charge is desired. It will, however, be noted that all of the liquid can be drawn off from the dispensing device when the sealing member is raised and the mouth of the bottle is sealed, so that the successive individual charges are dispensed directly from the bottom into the dispensing device and therefrom into the glass or receptacle without holding any large body of liquid within the device. The fruit juice or other liquid thus dispensed is accordingly fresh from the bottle and uncontaminated by standing exposed to the air or by mixture with parts of previously dispensed charges.

When it is desired to wash or flush the dispensing device, the bottle may be removed and washing liquid poured therein, or a bottle of washing liquid may be inverted in the manner shown and the sealing device raised only part way sufficient to permit continuous flow from the bottle into and from the dispensing device.

In the construction shown, the inner sleeve or shell 3 extends some distance above the upper end of the inclined slot 20. It will be understood, however, that this shell may extend to a greater or less height without changing its construction or mode of operation. So also, variations and modifications may be made in the specific embodiment of the invention illustrated without departing from its spirit and scope as set forth in the accompanying claims.

Having thus described my invention, what I claim is:

1. A dispensing device for fruit juice and other liquids, comprising means for supporting a bottle of the liquid in inverted position, a cup or receptacle surrounding the mouth of the bottle and provided with an opening in its bottom, a sealing device in said receptacle arranged when lowered to close said opening and when raised to seal the mouth of said bottle, and operating means for raising and lowering said sealing device, whereby charges of the liquid may be dispensed from said bottle into the receptacle upon lowering the sealing device, and from said receptacle upon raising the sealing device.

2. A dispensing device for fruit juice and other liquids, comprising means for supporting a bottle of the liquid in inverted position, a cup or receptacle adjustable with respect to said supporting means surrounding the mouth of the bottle and provided with an opening in its bottom, a sealing device in said receptacle arranged when lowered to close said opening and when raised to seal the mouth of said bottle, and operating means for raising and lowering said sealing device, whereby charges of the liquid may be dispensed from said bottle into the receptacle upon lowering the sealing device and from said receptacle upon raising the sealing device.

3. A dispensing device for fruit juice and other liquids, comprising an outer casing and supporting means therefor, bottle-holding means supported by said casing for holding a bottle in inverted position, a cup or receptacle within said casing surrounding the mouth of the bottle and provided with an opening in its bottom, a sealing device in said receptacle arranged when lowered to close said opening and when raised to seal the mouth of said bottle, and means operable by a drinking glass arranged below said opening for raising and lowering said sealing device, whereby charges of the liquid may be dispensed from said bottle into the receptacle upon lowering the sealing device and from said receptacle into the glass upon raising the sealing device.

4. A dispensing device for fruit juice or other liquids, comprising a casing and supporting means therefor, bottle-holding means supported by the casing for holding a bottle in inverted position, a cup or receptacle arranged within said casing surrounding the mouth of the bottle and provided with an opening in its bottom, means for raising and lowering said receptacle with respect to the casing and the mouth of the bottle, a sealing device in said receptacle arranged when lowered to close the opening in said receptacle and when raised to seal the mouth of the bottle, and operating means for raising and lowering said sealing device, whereby charges of the liquid may be dispensed from said bottle into the receptacle upon lowering the sealing device and from said receptacle upon raising the sealing device, and whereby the charge of liquid may be varied by raising and lowering said receptacle with respect to the mouth of the bottle.

5. A dispensing device for fruit juice and other liquids, comprising an outer casing and supporting means therefor, means within said casing for supporting the bottle in inverted position, a cover member at the top of said casing adjustable with respect thereto to close the space between the top of the casing and the bottle, a cup or receptacle surrounding the mouth of the bottle and provided with an opening in its bottom, a sealing device in said receptacle arranged when lowered to close said opening and when raised to seal the mouth of the bottle, whereby charges of the liquid may be dispensed from said bottle into the receptacle upon lowering the sealing device and from said receptacle upon raising the sealing device.

6. A dispensing device for fruit juice and other liquids, comprising means for supporting a bottle of the liquid in inverted position, a cup or receptacle surrounding the mouth of the bottle and provided with an opening in its bottom, a perforated cup-shaped sealing device carrying a valve for closing said opening when in lowered position and sealing means for sealing the mouth of the bottle when in raised position, whereby charges of the liquid may be dispensed from said bottle into the receptacle upon lowering the sealing device and from said receptacle upon raising the sealing device.

7. A dispensing device for fruit juice and other liquids, comprising an outer casing and supporting means therefor, bottle-holding means supported by said casing for holding a bottle in inverted position, an inner sleeve within said casing, a cup or receptacle supported by said inner sleeve surrounding the mouth of the bottle and provided with an opening in its bottom, a sealing device in said receptacle arranged when lowered to close said opening and when raised to seal the mouth of the bottle, and means for raising and lowering said inner sleeve with respect to the outer casing, thereby raising and lowering the receptacle with respect to the mouth of the bottle, whereby the amount of liquid dispensed may be increased or decreased by raising or lowering said receptacle.

8. A dispensing device for fruit juice and other liquids, comprising an outer casing and supporting means therefor, bottle holding means supported by said casing for holding a bottle in inverted position, an inner sleeve within said casing, a cup or receptacle supported by said inner sleeve surrounding the mouth of the bottle and provided with an opening in its bottom, a sealing device in said receptacle arranged when lowered to close said opening and when raised to seal the mouth of the bottle, an operating ring or member on the outside of said casing having one or more pins or projections extending through horizontal slots in the outer casing and inclined or helical slots in the inner sleeve, whereby the inner sleeve can be raised or lowered by rotation of said ring or operating means with respect to the outer casing, and the receptacle raised or lowered to vary the amount of the liquid charge dispensed.

9. A dispensing device for fruit juice and other liquids, comprising an outer casing provided with supporting means, means supported by the upper end of said casing for holding a bottle in inverted position, an inner sleeve within said outer casing and vertically adjustable with respect thereto, means for effecting such vertical adjustment, clamping means for holding the inner sleeve in adjusted position, a cup or receptacle supported by said inner sleeve and adjustable therewith, said receptacle surrounding the mouth of the bottle and provided with an opening in its bottom, a sealing device in said receptacle arranged when lowered to close said opening and when raised to seal the mouth of said bottle, and operating means extending between said receptacle and outer casing for raising and lowering said sealing device by means of a drinking glass arranged below said opening, whereby charges of the liquid may be dispensed from said bottle into the receptacle upon lowering the sealing device and from said receptacle upon raising the sealing device, and whereby the charge of liquid dispensed can be varied by adjustment of the inner sleeve and receptacle.

In testimony whereof I affix my signature.

WM. G. McCREA.

Copies of this patent may be obtained for five cents each, by addressing the "Commissioner of Patents, Washington, D. C."